United States Patent
Wong et al.

(10) Patent No.: US 9,621,474 B2
(45) Date of Patent: *Apr. 11, 2017

(54) BUFFER RELAY MANAGEMENT WITHIN SINGLE USER, MULTIPLE USER, MULTIPLE ACCESS, AND/OR MIMO WIRELESS COMMUNICATIONS

(71) Applicant: BROADCOM CORPORATION, Irvine, CA (US)

(72) Inventors: Chiu Ngok Eric Wong, San Jose, CA (US); Matthew James Fischer, Mountain View, CA (US)

(73) Assignee: Avago Technologies General IP (Singapore) Pte. Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/874,624

(22) Filed: Oct. 5, 2015

(65) Prior Publication Data

US 2016/0028639 A1 Jan. 28, 2016

Related U.S. Application Data

(63) Continuation of application No. 13/930,673, filed on Jun. 28, 2013, now Pat. No. 9,154,430.

(Continued)

(51) Int. Cl.
*H04L 12/26* (2006.01)
*H04L 12/835* (2013.01)
(Continued)

(52) U.S. Cl.
CPC ............ *H04L 47/30* (2013.01); *H04W 28/02* (2013.01); *H04W 28/0289* (2013.01); *H04W 88/02* (2013.01); *H04W 88/08* (2013.01)

(58) Field of Classification Search
CPC ....... H04L 47/10; H04L 47/266; H04L 47/29; H04L 47/30
(Continued)

(56) References Cited

U.S. PATENT DOCUMENTS 8,483,062 B2 * 7/2013 Yi ........................... H04L 47/10
370/235
9,154,430 B2 * 10/2015 Wong ..................... H04L 47/30
(Continued)

FOREIGN PATENT DOCUMENTS

CN 102111844 A 6/2011
CN 2011112056 A2 9/2011
(Continued)

OTHER PUBLICATIONS

Pathmasuntharam et al.; A Flow Control Framework for Improving Throughput and Energy Efficientcy in CSMA/CA based Wireless Multihop Networks; IEEE International Symposium on a World of Wireless, Mobile and Multimedia Networks; Jun. 2006; pp. 1-7.
(Continued)

*Primary Examiner* — Afshawn Towfighi
(74) *Attorney, Agent, or Firm* — Garlick & Markison; Shayne X. Short

(57) ABSTRACT

A relay wireless communication device is implemented to perform buffer management and coordination with a source wireless communication device. A relay wireless communication device (generally, a relay) informs a source wireless communication device (source) of the status of memory therein to store messages intended for a destination wireless communication device (destination). For example, the source transmits information to the relay, which buffers information before forwarding it on to the destination. This buffering may be a function of the source having additional information intended for the relay and/or destination. The
(Continued)

relay performs appropriate signaling, such as suspend transmission requests and resume transmission requests, to inform other devices in the system of its memory storage status (e.g., such as when having an actual or anticipated overflow). In one implementation, a suspend transmission request may be implemented by setting a particular bit within a communication from the relay to the source.

20 Claims, 10 Drawing Sheets

Related U.S. Application Data

(60) Provisional application No. 61/720,770, filed on Oct. 31, 2012, provisional application No. 61/766,795, filed on Feb. 20, 2013, provisional application No. 61/814,945, filed on Apr. 23, 2013, provisional application No. 61/819,238, filed on May 3, 2013, provisional application No. 61/822,504, filed on May 13, 2013, provisional application No. 61/822,510, filed on May 13, 2013.

(51) Int. Cl.
*H04W 28/02* (2009.01)
*H04W 88/02* (2009.01)
*H04W 88/08* (2009.01)

(58) Field of Classification Search
USPC .......................................................... 370/235
See application file for complete search history.

(56) References Cited

U.S. PATENT DOCUMENTS

| | | | |
|---|---|---|---|
| 2005/0013250 A1* | 1/2005 | Kauschke | H04L 47/10 370/235 |
| 2005/0014464 A1 | 1/2005 | Larsson | |
| 2006/0274680 A1 | 12/2006 | Zhu et al. | |
| 2007/0230433 A1 | 10/2007 | Okamasu et al. | |
| 2008/0112380 A1 | 5/2008 | Fischer | |
| 2009/0003261 A1 | 1/2009 | Kim | |
| 2010/0157826 A1 | 6/2010 | Yu et al. | |
| 2010/0302946 A1 | 12/2010 | Yang et al. | |
| 2010/0315948 A1 | 12/2010 | Yi et al. | |
| 2011/0019555 A1 | 1/2011 | Gotoh et al. | |
| 2012/0230247 A1 | 9/2012 | Kwon et al. | |

FOREIGN PATENT DOCUMENTS

| | | |
|---|---|---|
| CN | 102461248 A | 5/2012 |
| WO | 2011112056 A2 | 9/2011 |

OTHER PUBLICATIONS

German Patent Office; Application No. 10 2013 221 919.9; Office Action; Dec. 9, 2016; 7 pgs.

* cited by examiner

BUFFER RELAY MANAGEMENT WITHIN SINGLE USER, MULTIPLE USER, MULTIPLE ACCESS, AND/OR MIMO WIRELESS COMMUNICATIONS

CROSS REFERENCE TO RELATED PATENTS/PATENT APPLICATIONS

The present U.S. Utility Patent Application claims priority pursuant to 35 U.S.C. §120 as a continuation of U.S. Utility application Ser. No. 13/930,673, entitled "Buffer relay management within single user, multiple user, multiple access, and/or MIMO wireless communications," filed Jun. 28, 2013, pending, and scheduled subsequently to be issued as U.S. Pat. No. 9,154,430 on Oct. 6, 2015 (as indicated in an ISSUE NOTIFICATION mailed from the USPTO on Sep. 16, 2015), which claims priority pursuant to 35 U.S.C. §119(e) to U.S. Provisional Application No. 61/720,770, entitled "Relay within single user, multiple user, multiple access, and/or MIMO wireless communications," filed Oct. 31, 2012; U.S. Provisional Application No. 61/766,795, entitled "Relay within single user, multiple user, multiple access, and/or MIMO wireless communications," filed Feb. 20, 2013; U.S. Provisional Application No. 61/814,945, entitled "Relay within single user, multiple user, multiple access, and/or MIMO wireless communications," filed Apr. 23, 2013; U.S. Provisional Application No. 61/819,238, entitled "Relay within single user, multiple user, multiple access, and/or MIMO wireless communications," filed May 3, 2013; U.S. Provisional Application No. 61/822,504, entitled "Relay within single user, multiple user, multiple access, and/or MIMO wireless communications," filed May 13, 2013; and U.S. Provisional Application No. 61/822,510, entitled "Buffer relay management within single user, multiple user, multiple access, and/or MIMO wireless communications," filed May 13, 2013; all of which are hereby incorporated herein by reference in their entirety and made part of the present U.S. Utility Patent Application for all purposes.

BACKGROUND

Technical Field

The present disclosure relates generally to communication systems; and, more particularly, to relaying based memory and buffer management within single user, multiple user, multiple access, and/or MIMO wireless communications.

Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into RF signals that are transmitted to a RX that includes two or more antennae and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennae to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

Within such wireless communication systems, large distances between devices may cause problems and degrade communication performance. For example, fading and other undesired effects might reduce performance and the efficacy of communication between devices as the distance between them increases.

DETAILED DESCRIPTION

Figure 1:
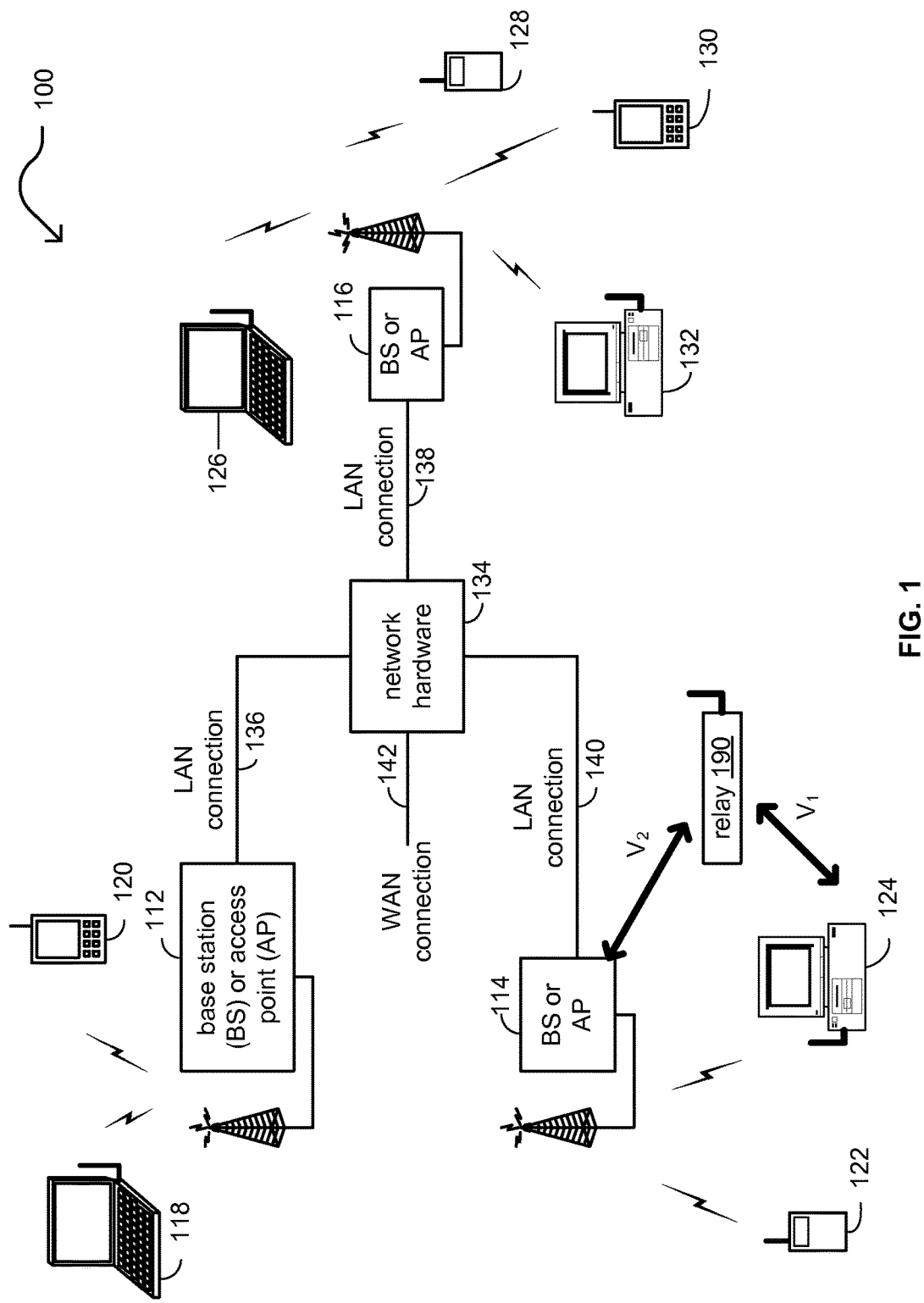
FIG. 1 is a diagram illustrating one or more embodiments of a wireless communication system.

FIG. 1 is a diagram illustrating one or more embodiments 100 of a wireless communication system. The wireless communication system 100 that includes base stations and/or access points 112-116, wireless communication devices 118-132 and a network hardware component 134. The wireless communication devices 118-132 may be laptop host computers 118 and 126, personal digital assistant hosts 120 and 130, personal computer hosts 124 and 132 and/or cellular telephone hosts 122 and 128. The details of an embodiment of such wireless communication devices are described in greater detail with reference to FIG. 2.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Any of the various wireless communication devices in this diagram may include a corresponding communication interface to support communications with other devices. Via a communication interface, a relay wireless communication device may receive one or more frames from a source wireless communication device. The relay wireless communication device then generates a relayed frame, based at least in part on the frame received from the source wireless communication device. Considering one example of relaying by a relay wireless communication device 190, personal computer 124 and base station and/or access point 114 may be unable to communicate for any of a number of reasons (e.g., fading, interference, etc.). The relay wireless communication device 190 receives a frame from the personal computer 124 as shown by hop $V_1$. The relay wireless communication device 190 then generates and transmits a relayed frame to the base station and/or access point 114 as shown by hop $V_2$. Note that the reverse operations can alternatively be performed, such that relaying from the base station and/or access point 114 is made via the relay wireless communication device 190 to the personal computer 124.

Herein, the terms source wireless communication device, relay wireless communication device, and destination wireless communication device are employed. Any of these wireless communication devices may be implemented as any of the various wireless communication devices 118-132, or other types of wireless communication devices as well. Sometimes, for brevity, references of source, relay, and destination (or source device, relay device, and destination device, or other such equivalents) are used instead of source wireless communication device, relay wireless communication device, and destination wireless communication device.

A wireless communication device, such as any of the various wireless communication devices 118-132, may operate a relay. Such a device can include a communication interface configured to receive one or more frames from a source wireless communication device, and also to transmit frames to a destination wireless communication device. A relayed frame transmitted to the destination wireless communication device can include all or a portion of a frame received from the source. In a wireless context, various processing may be performed to generate the relayed frame such as reprogramming the source and destination address, etc.

For example, a relay operates to forward or relay information received from a source to a destination. Such a wireless communication device may also include a memory configured to buffer information received from the source (via one or more transmissions) and to assist in transmitting at least a portion of that first information (e.g., such as data or payload therein) to the destination via a relayed frame. For example, one or more retransmission attempts of information within that signal may be achieved by storing or buffering all or a portion of the first signal within the relay wireless communication device.

Depending upon information stored within the memory, the storage status of the memory will change over time. For example, if very little information is stored in the memory, then the storage status of the memory will indicate a relatively large amount of storage capacity available. Alternatively, if a large amount of information is stored in memory, then the storage status of the memory will indicate an anticipated or expected storage overflow of the memory (e.g., when the memory is approximately or substantially full and there is little available memory for storage, as may be defined within any industry-accepted tolerance ranges). If the memory is completely filled, that the storage status of the memory will indicate an actual storage overflow the memory.

As the amount of information stored within the memory varies, as differing numbers of signals and information received from the first wireless communication device are stored in the memory, there may be times in which the memory cannot receive and appropriately store additional signals that may be transmitted from the first wireless communication device.

As such, the relay wireless communication device may be implemented include a processor configured to generate, based on storage status of the memory, a suspend transmission request for the first wireless communication device. This suspend transmission request directs the first wireless communication device to abstain from transmitting any signal to the relay wireless communication device for a predetermined period of time. The relay wireless communication device may then transmit the suspend transmission request to the first wireless communication device within a third signal.

In some embodiments, the relay wireless communication device transmits a resume transmission request to the first wireless communication device to indicate that the relay wireless communication device is now able to store subsequent signals received from the first wireless communication device. Alternatively, other embodiments operate such that the first wireless communication device merely abstains from transmitting additional signals for some specified period of time. It is noted that a resume transmission request may be provided to the first wireless communication device before the expiration of such a specified period of time. In such instances, a resume transmission request could be used to override the first wireless communication devices operation of abstaining from transmission for the specified period of time (e.g., transmissions could be made before the expiration of that period of time).

Generally, various embodiments perform management of a buffer or memory at a relay wireless communication device within the communication system. As may be understood, variations and changes of channel conditions (e.g., including between a relay wireless communication device and a destination wireless communication device) may cause frames to be continuously buffered at the relay wireless communication device. In some instances, such as when transmissions from the relay wireless communication device to the destination wireless communication device are unsuccessful, a memory or buffer overflow (e.g., a queue overflow) may occur at the relay wireless communication device.

The source wireless communication device may be unaware of the downstream congestion, and it may unfortunately continue to forward frames to the relay wireless communication device. This may then require retransmission of frames from the source wireless communication device to the relay wireless communication device, and this will degrade media access control (MAC) efficiency of these wireless communication devices. In one embodiment, a suspend transmission request is made by adding a bit in a MAC header (e.g., of a communication from the relay wireless communication device to the source wireless communication device) to govern flow control. This is used by the relay wireless communication device to signal to the source wireless communication device to stop or start (or restart, such as after a timeout of some period of time, or based on a resume transmission request) transmissions to the relay wireless communication device.

Figure 2:
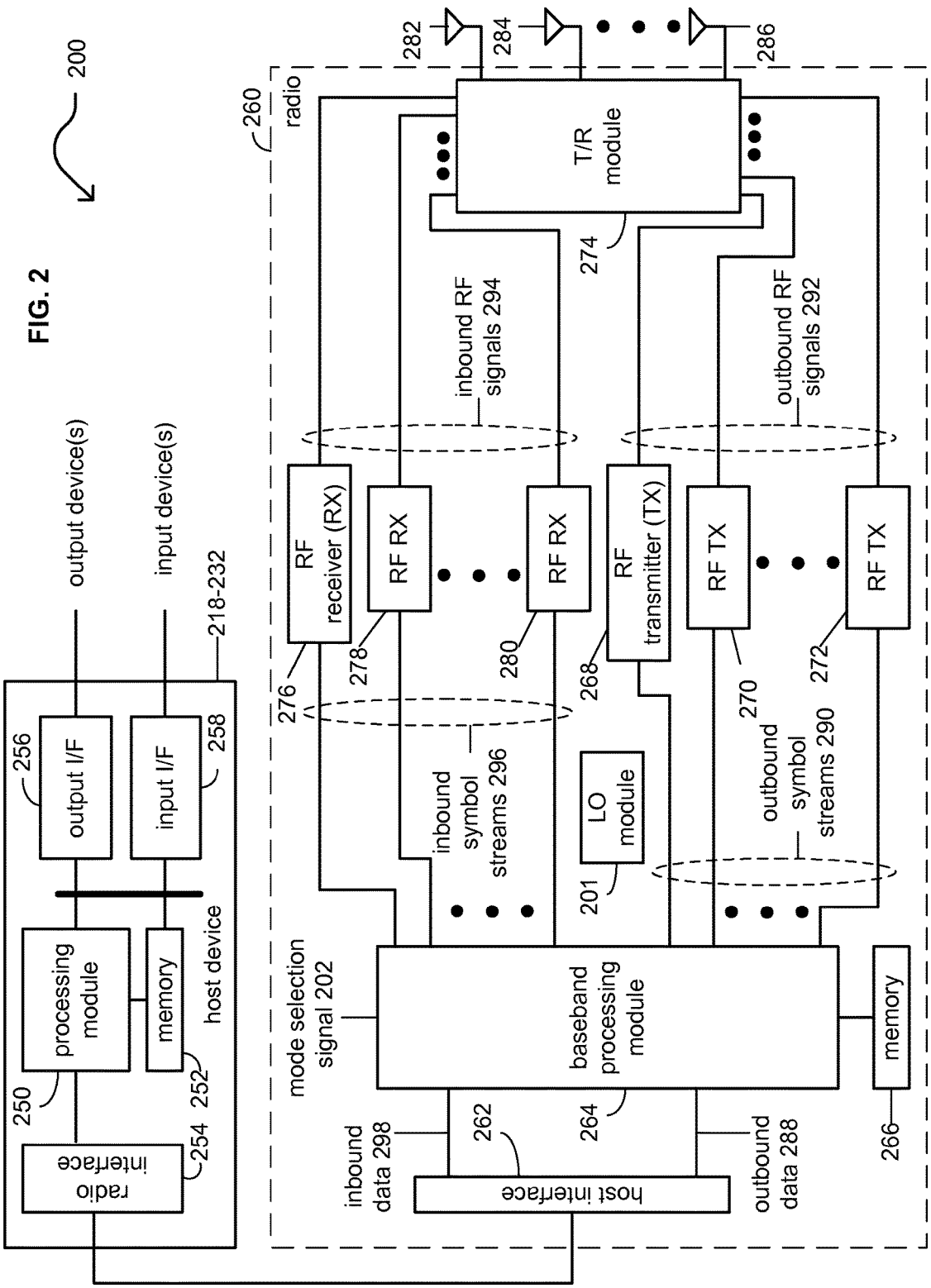
FIG. 2 is a diagram illustrating one or more embodiments of a wireless communication device.

FIG. 2 is a diagram illustrating one or more embodiments 200 of a wireless communication device. The embodiment 200 of a wireless communication device includes host device 218-232 and an associated radio 260. In some embodiments, one or more of the host device 218-232 may be implemented as one or more of the wireless communication devices 118-132. For cellular telephone hosts, the radio 260 is a built-in component. For personal digital assistants hosts, laptop hosts, and/or personal computer hosts, the radio 260 may be built-in or an externally coupled component. For access points or base stations, the components are typically housed in a single structure. Host device 218-232 includes a processing module 250, memory 252, radio interface 254, input interface 258 and output interface 256. Processing module 250 and memory 252 execute corresponding instructions typically done by the host device. For example, for a cellular telephone host device, the processing module 250 performs the corresponding communication functions in accordance with a particular cellular telephone standard.

The radio interface 254 allows data to be received from and sent to the radio 260. For data received from the radio 260 (e.g., inbound data), the radio interface 254 provides the data to the processing module 250 for further processing and/or routing to the output interface 256. The output interface 256 provides connectivity to one or more output display devices such as a display, monitor, speakers, etc. such that the received data may be displayed. The radio interface 254 also provides data from the processing module 250 to the radio 260. The processing module 250 may receive the outbound data from one or more input devices such as a keyboard, keypad, microphone, etc. via the input interface 258 or generate the data itself.

Radio 260 includes a host interface 262, a baseband processing module 264, memory 266, radio frequency (RF) transmitters (TXs) 268-272, a transmit/receive (T/R) module 274, antennae 282-286, RF receivers (RXs) 276-280, and a local oscillation module 201. The baseband processing module 264, in combination with operational instructions stored in memory 266, execute digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion.

In operation, the radio 260 receives outbound data 288 from the host device via the host interface 262. The baseband processing module 264 receives the outbound data 288 and, based on a mode selection signal 202, produces one or more outbound symbol streams 290. The mode selection signal 202 will indicate a particular mode as are illustrated in the mode selection tables as may be understood by the reader. For example, the mode selection signal 202 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. Also, in such mode selection tables, a code rate is supplied as well as number of coded bits per subcarrier (NBPSC), coded bits per OFDM symbol (NCBPS), data bits per OFDM symbol (NDBPS). The mode selection signal may also indicate a particular channelization for the corresponding mode which for the information in one of the mode selection tables with reference to another of the mode selection tables. Note that other types of channels, having different bandwidths, may be employed in other embodiments.

The baseband processing module 264, based on the mode selection signal 202 produces the one or more outbound symbol streams 290 from the output data 288. For example, if the mode selection signal 202 indicates that a single transmit antenna is being utilized for the particular mode that has been selected, the baseband processing module 264 will produce a single outbound symbol stream 290. Alternatively, if the mode selection signal indicates 2, 3 or 4 antennae, the baseband processing module 264 will produce 2, 3 or 4 outbound symbol streams 290 corresponding to the number of antennae from the output data 288.

Depending on the number of outbound streams 290 produced by the baseband processing module 264, a corresponding number of the RF transmitters 268-272 will be enabled to convert the outbound symbol streams 290 into outbound RF signals 292. The transmit/receive module 274 receives the outbound RF signals 292 and provides each outbound RF signal to a corresponding antenna 282-286.

When the radio 260 is in the receive mode, the transmit/receive module 274 receives one or more inbound RF signals via the antennae 282-286. The T/R module 274 provides the inbound RF signals 294 to one or more RF receivers 276-280. The RF receiver 276-280 converts the inbound RF signals 294 into a corresponding number of inbound symbol streams 296. The number of inbound symbol streams 296 will correspond to the particular mode in which the data was received. The baseband processing module 264 receives the inbound symbol streams 296 and converts them into inbound data 298, which is provided to the host device 218-232 via the host interface 262.

In one embodiment of radio 260 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the baseband processing module 264, is operably coupled to convert the MPDU into a PLCP Protocol Data Unit (PPDU) in accordance with the WLAN protocol. The Physical Medium Dependent (PMD) module is operably coupled to convert the PPDU into radio frequency (RF) signals in accordance with one of the operating modes of the WLAN protocol, wherein the operating modes includes multiple input and multiple output combinations.

An embodiment of the Physical Medium Dependent (PMD) module includes an error protection module, a demultiplexing module, and direction conversion modules. The error protection module, which may be implemented in the baseband processing module 264, is operably coupled to restructure a PPDU (PLCP (Physical Layer Convergence Procedure) Protocol Data Unit) to reduce transmission errors producing error protected data. The demultiplexing module is operably coupled to divide the error protected data into error protected data streams The direct conversion modules are operably coupled to convert the error protected data streams into radio frequency (RF) signals.

As one of average skill in the art will appreciate, the wireless communication device of FIG. 2 may be implemented using one or more integrated circuits in accordance with any desired configuration or combination or components, modules, etc. within one or more integrated circuits.

The wireless communication device 200 includes a communication interface configured to receive one or more frames from a source wireless communication device, and also to transmit frames to a destination wireless communication device. As described above, a relay wireless communication device may transmit a suspend transmission request to a first or source wireless communication device to direct that device to stop transmitting signals to the relay. The relay may also provide a resume transmission request to the first or source wireless communication device when the relay is ready to receive additional signaling from the first or source wireless communication device. For example, after the relay has successfully transmitted information within its memory to a second or destination wireless location device, then the relay will be able to receive more signaling from the first or source wireless location device.

Such information may be provided to the first or source wireless communication device in terms of storage status of the memory of the relay. Appropriate signaling from the relay to the first or source wireless communication device will ensure that additional signals are not sent from the first or source wireless communication device that may not be appropriately received, processed, and/or stored in the memory of the relay.

In one embodiment, the suspend transmission request may be achieved using a relay flow suspend action frame includes at least one bit therein that is set to a particular value. Also, a relay flow resume action frame may be employed to inform the first or source wireless communication device that transmission of signals may be resumed to the relay.

Figure 3:
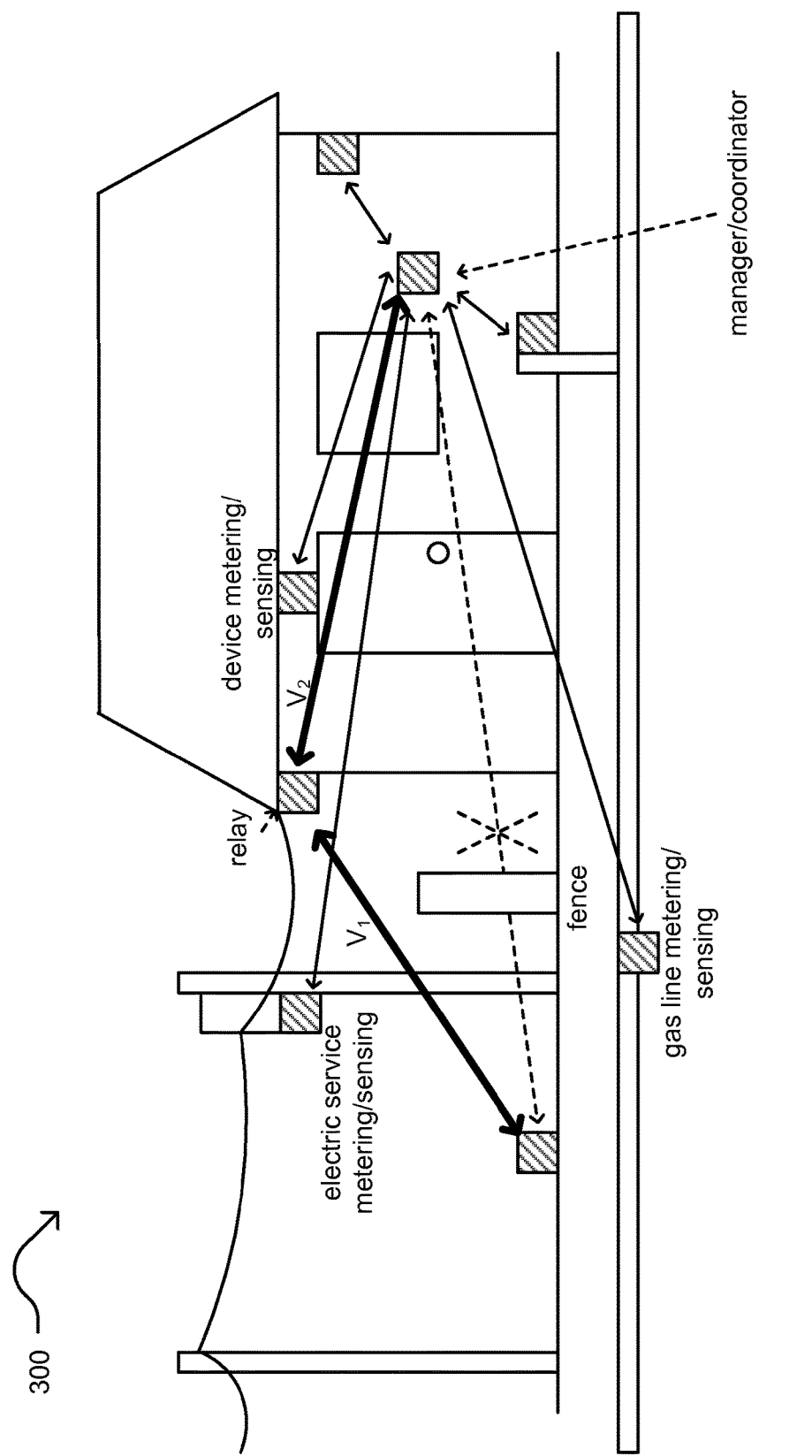
FIG. 3 is a diagram illustrating an embodiment of a number of wireless communication devices, some operative as smart meter stations (SMSTAs).

FIG. 3 is a diagram illustrating an embodiment 300 of a number of wireless communication devices, some operative as smart meter stations (SMSTAs), implemented in various locations in an environment including a building or structure.

In certain instances, various wireless communication devices may be implemented to support communications associated with monitoring and/or sensing of any of a variety of different conditions, parameters, etc. Such wireless communication devices may provide such information to another wireless communication device. Such communications may be performed using relaying as described herein.

For example, in some instances, a wireless communication device may be implemented as a smart meter station (SMSTA). A SMSTA may have certain characteristics similar to a wireless station (STA), yet be also operative to perform communications associated with one or more measurements in accordance with monitoring and/or sensing. In certain applications, such devices may operate only very rarely. For example, when compared to the periods of time in which such a device is in power savings mode (e.g., a sleep mode, a reduced functionality operational mode a lowered power operational mode, etc.), the operational periods of time may be miniscule in comparison (e.g., only a few percentage of the periods of time in which the device is in such a power savings mode).

An SMSTA may awaken from such a power savings mode only to perform certain operations. For example, such a device may awaken from such a power savings mode to perform sensing and/or measurement of one or more parameters, conditions, constraints, etc. During such an operational period (e.g., in which the device is not in a power savings mode), the device may also perform transmission of such information to another wireless communication device (e.g., an access point (AP), another SMSTA, a wireless station (STA), or such an SMSTA or STA operating as an AP, etc.).

It is noted that such a device may enter into an operational mode for performing sensing and/or monitoring at a frequency that is different than (e.g., greater than) the frequency at which the device enters into an operational mode for performing transmissions. For example, such a device may awaken a certain number of times to make successive respective sensing and/or monitoring operations, and such data as is acquired during those operations may be stored (e.g., in a memory storage component within the device), and during a subsequent operational mode dedicated for transmission of the data, multiple data portions corresponding to multiple respective sensing and/or monitoring operations may be transmitted during that operational mode dedicated for transmission of the data.

In this diagram, multiple respective wireless communication devices are implemented to forward information related to monitoring and/or sensing to one particular wireless communication device that may be operating as a manager, coordinator, etc. such as may be implemented by an access point (AP) or a wireless station (STA) operating as an AP. Generally speaking, such wireless communication devices may be implemented to perform any of a number of data forwarding, monitoring and/or sensing operations. For example, in the context of a building or structure, there may be a number of services that are provided to that building or structure, including natural gas service, electrical service, television service, Internet service, etc. Alternatively, different respective monitors and/or sensors may be implemented throughout the environment to perform monitoring and/or sensing related to parameters not specifically related to services. As some examples, motion detection, door ajar detection, temperature measurement (and/or other atmospheric and/or environmental measurements), etc. may be performed by different respective monitors and/or sensors implemented in various locations and for various purposes.

Different respective monitors and/or sensors may be implemented to provide information related to such monitoring and/or sensing functions wirelessly to the manager/coordinator wireless communication device. Such information may be provided continuously, sporadically, intermittently, etc. as may be desired in certain applications.

In addition, it is noted that such communications between such a manager/coordinator wireless communication device of the different respective monitors and/or sensors may be cooperative in accordance with such bidirectional communications, in that, the manager/coordinator wireless communication device may direct the respective monitors and/or sensors to perform certain related functions at subsequent times.

For any of a number of various reasons, any of the various STAs or SMSTAs within a wireless communication system may be unable to communicate with one another or with a manager/coordinator wireless communication device (e.g., fading, interference, weak/inefficient communication link, etc.). While various forms of signal degradation such as fading and interference may degrade or prohibit communications between the devices, certain physical features (e.g., buildings, fences, hills, etc.) may also degrade or prohibit such communications. In such a situation, to support communications between any one of the STAs or SMSTAs and another one of them or the manager/coordinator wireless communication device, a wireless communication device may operate as a relay between the these two devices.

One of these wireless communication devices may be selected using various options. A source may select one of the other devices as a relay. Alternatively, a source could broadcast a frame, and a first responding device may serve as the relay. In even other situations, one of the wireless communication devices could volunteer to serve as relay between a source and destination that cannot acceptably communicate with one another. For example, a SMSTA that is unable to communicate acceptably well with the manager/coordinator wireless communication device may communicate with the manager/coordinator wireless communication device via a relay, as shown by the two hops or communication links to and from the relay.

Figure 4B:
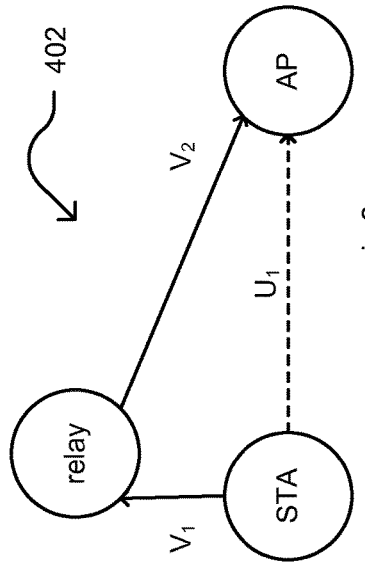
FIG. 4B is a diagram illustrating another example of a wireless communication system including a wireless relay communication device implemented in between 2 other wireless communication devices.
Figure 4D:
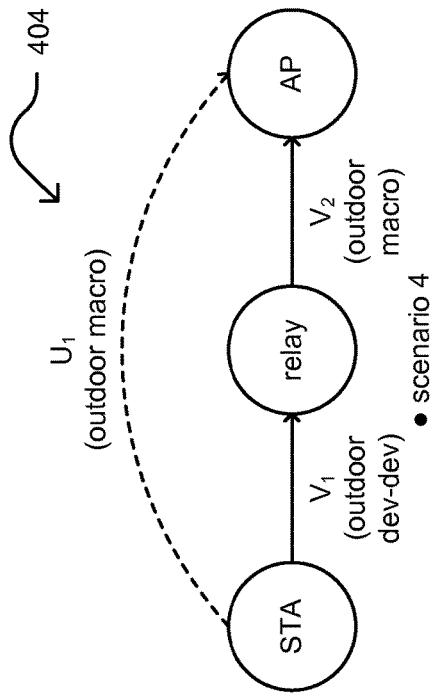
FIG. 4D is a diagram illustrating another example of a wireless communication system including a wireless relay communication device implemented in between 2 other wireless communication devices.
Figure 4A:
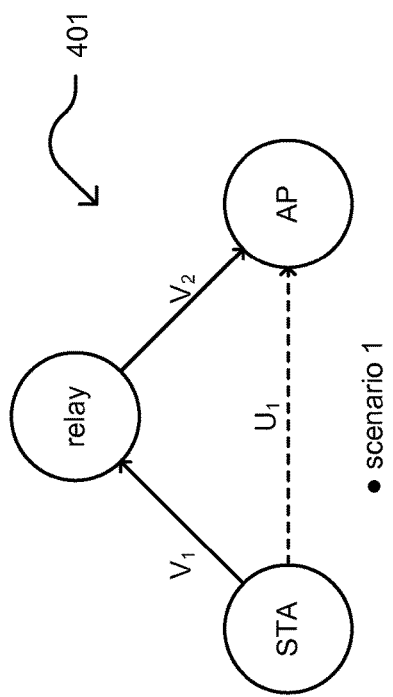
FIG. 4A is a diagram illustrating an example of a wireless communication system including a wireless relay communication device implemented in between 2 other wireless communication devices.

FIG. 4A is a diagram illustrating an example 401 of a wireless communication system including a wireless relay communication device implemented in between 2 other wireless communication devices. As may be seen with respect to scenario 1 of this diagram, a relay (e.g., middling, intervening, etc. wireless communication device) is positioned equal distance between a first wireless communication device (e.g., a wireless station (STA)) and a second wireless communication device)(e.g., an access point (AP)). There are two paths available: direct and relay. Comparing the relay path to the direct path, the path via relay needs more frames with shorter PPDU duration for the same number of bytes. This may require separate channel access for next frame transmission over the relay-STA hop. A shorter TX-RX cycle via the relay path allows STA to operate with lesser power consumption.

FIG. 4B is a diagram illustrating another example 402 of a wireless communication system including a wireless relay communication device implemented in between 2 other wireless communication devices. Referring to scenario 2 of this diagram, a relay is positioned relatively closer to a first wireless communication device (e.g., STA) than to a second wireless communication device (e.g., AP). As shown in the diagram, the STA proximity to the relay permits the use of higher modulation coding set (MCS) and consumes lesser power for hop $V_1$. The relay requires separate channel access for next hop. The relay may be another sensor on wall-power, and path loss is outdoor device-device.

Figure 4C:
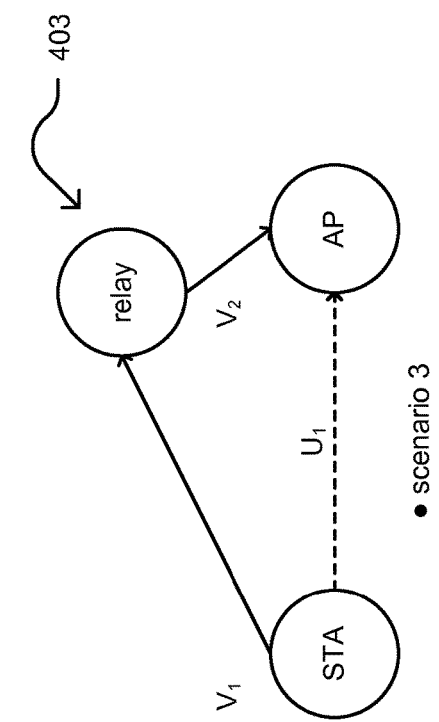
FIG. 4C is a diagram illustrating another example of a wireless communication system including a wireless relay communication device implemented in between 2 other wireless communication devices.

FIG. 4C is a diagram illustrating another example 403 of a wireless communication system including a wireless relay communication device implemented in between 2 other wireless communication devices. Referring to scenario 3 of this diagram, a relay is positioned relatively closer to a first wireless communication device (e.g., AP) and away from a second wireless communication device (STA). The relay path may be suboptimal than a direct path between the AP and the STA (e.g., relay selection=path selection). If relay is another sensor and STA-relay hop is outdoor device-device path loss, then relay may not be reachable by STA with the same MCSs.

FIG. 4D is a diagram illustrating another example 404 of a wireless communication system including a wireless relay communication device implemented in between 2 other wireless communication devices. Referring to scenario 4 of this diagram, in a situation where the STA-relay-AP may be arranged in a straight line, and when the STA sends one uplink DATA, then the following observations may be made.

Total Medium Time: PPDU($V_1$)+ACK($V_1$)+PPDU($V_2$)+ACK($V_2$)+3×SIFS

STA ON Time: PPDU($V_1$)+ACK($V_1$)+SIFS

STA-Relay Factor: ratio of Distance ($V_1$) to Distance ($U_1$) (e.g., Distance ($V_1$)/Distance ($U_1$))

In the above observations, PPDU time is based on PLCP Protocol Data Unit (PPDU) transmission time. ACK time is based on acknowledgement (ACK) transmission time. SIFS time shown below is based on short interframe space (SIFS). The variable, $V_1$ and $V_2$, correspond to the respective distances indicated in the diagram and between the communication devices.

Generally speaking, a relay wireless communication device (or generally referred to as a relay) will forward information received from a first wireless communication device onto a second wireless communication device. In some embodiments, no more than two hops or communication links are made to forward information from a first to a second wireless communication device via a relay.

Appropriate signaling within the various communications between the originating device, the relay device, and the destination device ensures appropriate coordination and operation.

Within such communication systems including a source wireless communication device, a destination wireless communication device, and an intervening or middling relay wireless communication device (e.g., source, destination, and relay), there may be instances in which the relay does not have adequate storage capacity to receive additional signals from the source. In such instances, the relay may provide a suspend transmission request to the source directing the source to abstain from transmitting any signal to the relay. The source may abstain from transmitting signals to the relay for a specified period of time based on suspend transmission request. Alternatively, the source may abstain from transmitting any signals to the relay until the subsequent receipt of a resume transmission request received from the relay.

Appropriate communication and signaling between the relay and source ensure that transmissions are not made from the source to the relay which may be lost, or for which the relay does not currently have the capability to receive, process, and/or store therein. For example, as the storage capacity of a memory in the relay will vary over time, depending upon how many messages may be stored therein, there may be instances in which the relay cannot and properly handle signaling from the source. As such, appropriate communication and signaling is made between the relay of the source to ensure that the source transmits signals to the relay when the relay can appropriately receive and process them.

Figure 5:
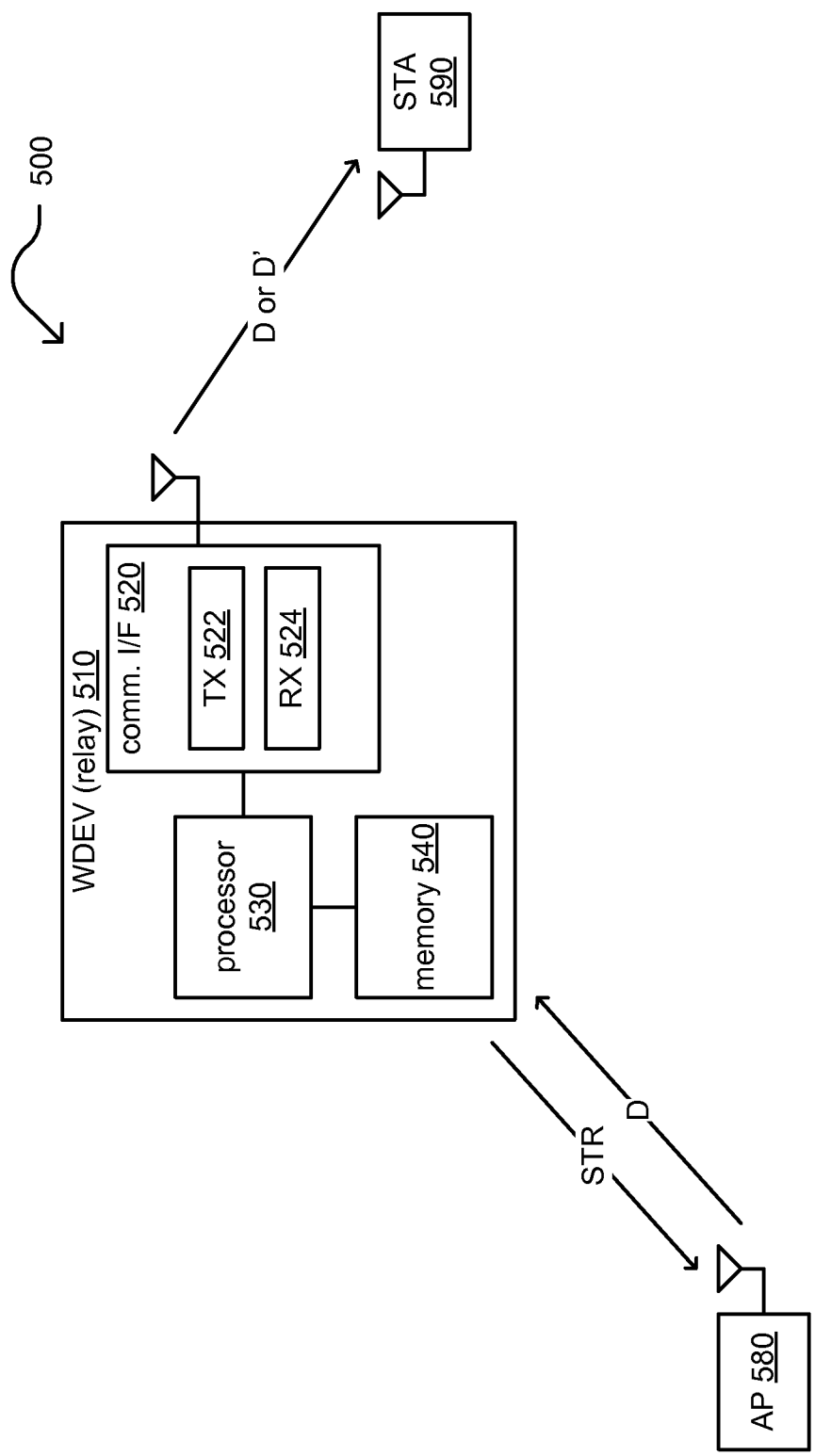
FIG. 5 is a diagram illustrating an embodiment of wireless communication devices that perform suspend/resume transmission.

FIG. 5 is a diagram illustrating an embodiment 500 of wireless communication devices that perform suspend/resume transmission. A wireless communication device (relay) 510 is in communication with a source wireless communication device (AP 580 in the diagram) and a destination wireless communication device (STA 590 in the diagram). The wireless communication device (relay) 510 includes a communication interface 520 to perform transmitting and receiving of one or more frames (e.g., using a transmitter 522 and a receiver 524). The wireless communication device (relay) 510 also includes a processor 530, and an associated memory 540, to execute various operations including interpreting one or more frames transmitted from the source wireless communication device (AP 580) and the destination wireless communication device (STA 590).

The source wireless communication device (AP 580) operates to transmit a frame (shown as D in the diagram) to a destination wireless communication device (STA 590). The intervening or middling relay wireless communication device (relay) 510 serves to perform the relaying of one or more frames from the AP 580 to the STA 590. The frame that eventually gets transmitted from the relay 510 to the STA 590 may include the entirety of the frame D transmitted from the AP or it may be a subset of that particular frame (e.g., shown as D' in the diagram), such as the data or payload portion of the frame transmitted from the AP.

When the memory 540 within the relay 510 is at or approaching storage overflow (e.g. when a storage status of the memory 540 indicates an actual or anticipated storage overflow the memory 540), the relay 510 transmits a suspend transmission request (STR in the diagram) to the AP 580. Based upon the STR, the AP 510 may abstain from transmitting signals to the relay 510 for a specified period of time. Alternatively, the AP 580 may abstain from transmitting any signals to the relay 510 until the subsequent receipt of a resume transmission request received from the relay 510.

In an alternative embodiment, the AP 580 may initially abstain from transmitting signals to the relay 510 for a specified period of time, but the AP 580 may receive a resume transmission request from the relay before the expiration of that time. In such an embodiment, the resume transmission request may override the operation based on the specified period of time, and the AP 580 may then resume transmitting signals to the relay. Note that the source wireless communication device may be a STA and the destination wireless communication device may be an AP in an alternative implementation.

Figure 6:
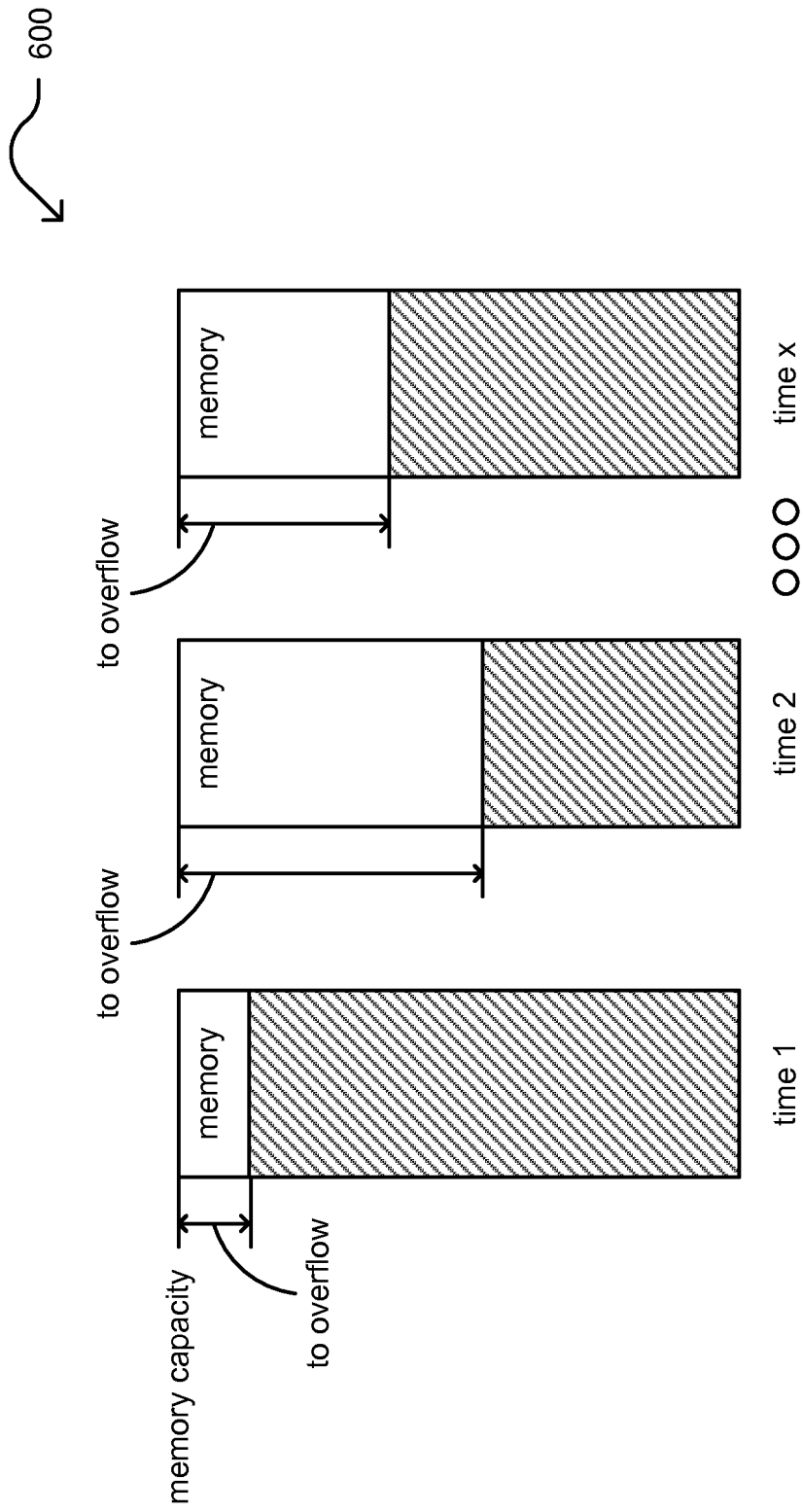
FIG. 6 is a diagram illustrating an example of varying storage status of a memory implemented in a wireless communication device.

FIG. 6 is a diagram illustrating an example 600 of varying storage status of a memory implemented in a wireless communication device. The memory within a relay wireless communication device (generally referred to as relay) will vary as a function of time. Depending upon a number of signals received from a source wireless communication device, and depending upon the successful transmission of information to a destination wireless communication device, the amount of information stored within the memory of the relay will increase and decrease over time.

The amount of available memory within the relay is used to provide an indication of the storage status of the memory. For example, as the amount of available memory (e.g., that memory which is not currently storing information) is relatively small, and anticipated storage overflow of the memory may be near. If there is no available memory for storage, then an actual storage overflow the memory is imminent or has already occurred. A storage status of the memory may correspond to how much memory is available for storage of information. This storage status may also have other information associated therewith, such as historical or recent trending of information (e.g., the amount of available memory continuing to decrease or increase, remain relatively stable, etc.).

Generally speaking, information associated with memory storage status within a relay wireless communication device may be used to direct the generation of a suspend transmission request to be provided to a source wireless communication device. The relay will appropriately communicate to the source wireless communication device whether to suspend or resume transmissions to the relay wireless communication device based upon the stored status of the memory within the relay wireless communication device.

Figure 7:
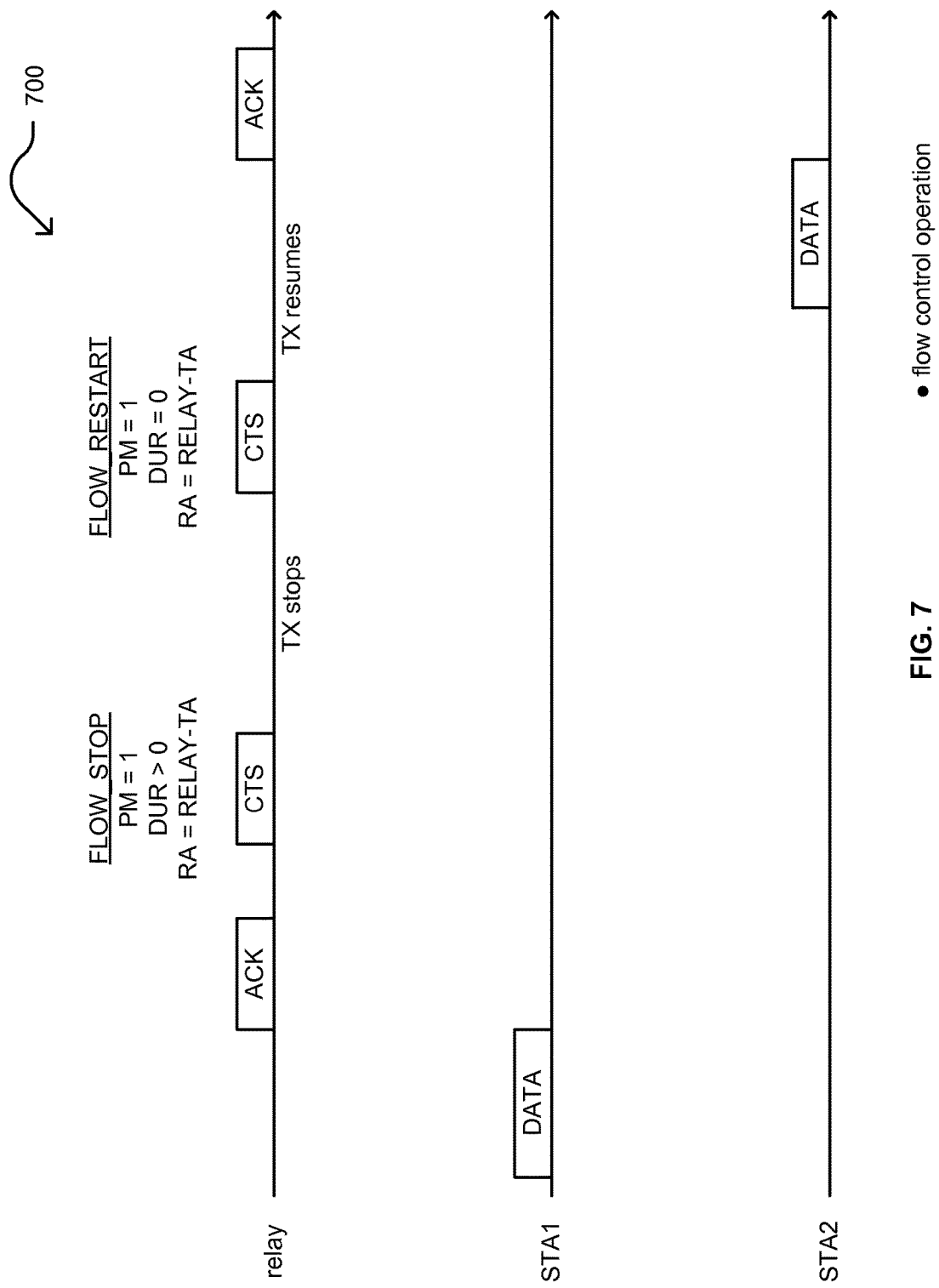
FIG. 7 is a diagram illustrating an example of flow control operation as used for memory and buffer management among various wireless communication devices.

FIG. 7 is a diagram illustrating an example 700 of flow control operation as used for memory and buffer management among various wireless communication devices. Initially, a first or source wireless communication device (STA1 in the diagram) transmits data intended for a second or destination wireless communication device (STA2 in the diagram). The relay provides an acknowledgement (ACK) to STA1 upon receipt of that data.

In the instance that the relay is unable to forward that data to the STA2 in the current transmission opportunity (TXOP) (e.g., a period in which the relay may operate to receive information from a source device and forward it to a destination device), the relay may transmit a clear to send (CTS) notifying other wireless communication devices within the system including the STA1. Additional storing of signals received from the STA1 may cause the available storage capacity within buffer or memory of the relay to reduce. As such, the relay transmitting the CTS will signal the STA1 to stop transmitting signals to the relay, or signal FLOW_STOP.

Any other devices within the system, such as STA2, that receive such a FLOW_STOP notification shall not transmit to the relay (e.g., the wireless communication device addressed in the receiver address (RA) for a particular period of time such as which may be specified within a DUR field). Any wireless communication devices within an overlapping basic services set (OBSS) may ignore the CTS transmission (e.g., if the CTS has a PM value of PM=1 therein).

After transmission of the CTS, transmissions to the relay stop. Then, after some period of time, a subsequent CTS may be employed to indicate that transmissions to the relay may resume, or signal FLOW_RESTART. This indication will then resume normal operation for frame transmissions to the relay (e.g., the wireless communication device addressed RA). Again, any wireless communication devices within an overlapping basic services set (OBSS) may ignore the CTS transmission (e.g., if the CTS has a PM value of PM=1 therein).

Flow Control Procedure (FIG. 7)

To stop frame transmissions to a relay operative wireless communication device (e.g., relay AP), that particular relay operative wireless communication device (e.g., relay AP) may send a CTS-to-self frame with PM set to 1, DUR>0.

The respective associated wireless communication devices (e.g., STAs) shall not transmit to the wireless communication device (e.g., STA) addressed in the receiver address (RA) for the amount of duration (DUR) time. The associated wireless communication devices (e.g., STAs) may update its or their network allocation vector (NAV) with DUR. Non-associated STAs may ignore the DUR field.

To restart frame transmissions to relay operative wireless communication device (e.g., relay AP), that particular relay operative wireless communication device (e.g., relay AP) may send a CTS-to-self frame with PM set to 1, DUR=0.

The respective associated wireless communication devices (e.g., STAs) shall cancel the flow suspend time, and resume normal procedure for frame transmissions to the wireless communication device (e.g., STA) addressed in the RA. The associated wireless communication devices (e.g., STAs) may cancel its or their NAV, and resume normal channel access for frame transmissions. Non-associated STAs may ignore the DUR field. A relay operative wireless communication device (e.g., relay AP) shall set To DS=0 and From DS=1 when sending the CTS-to-self frame.

Figure 8:
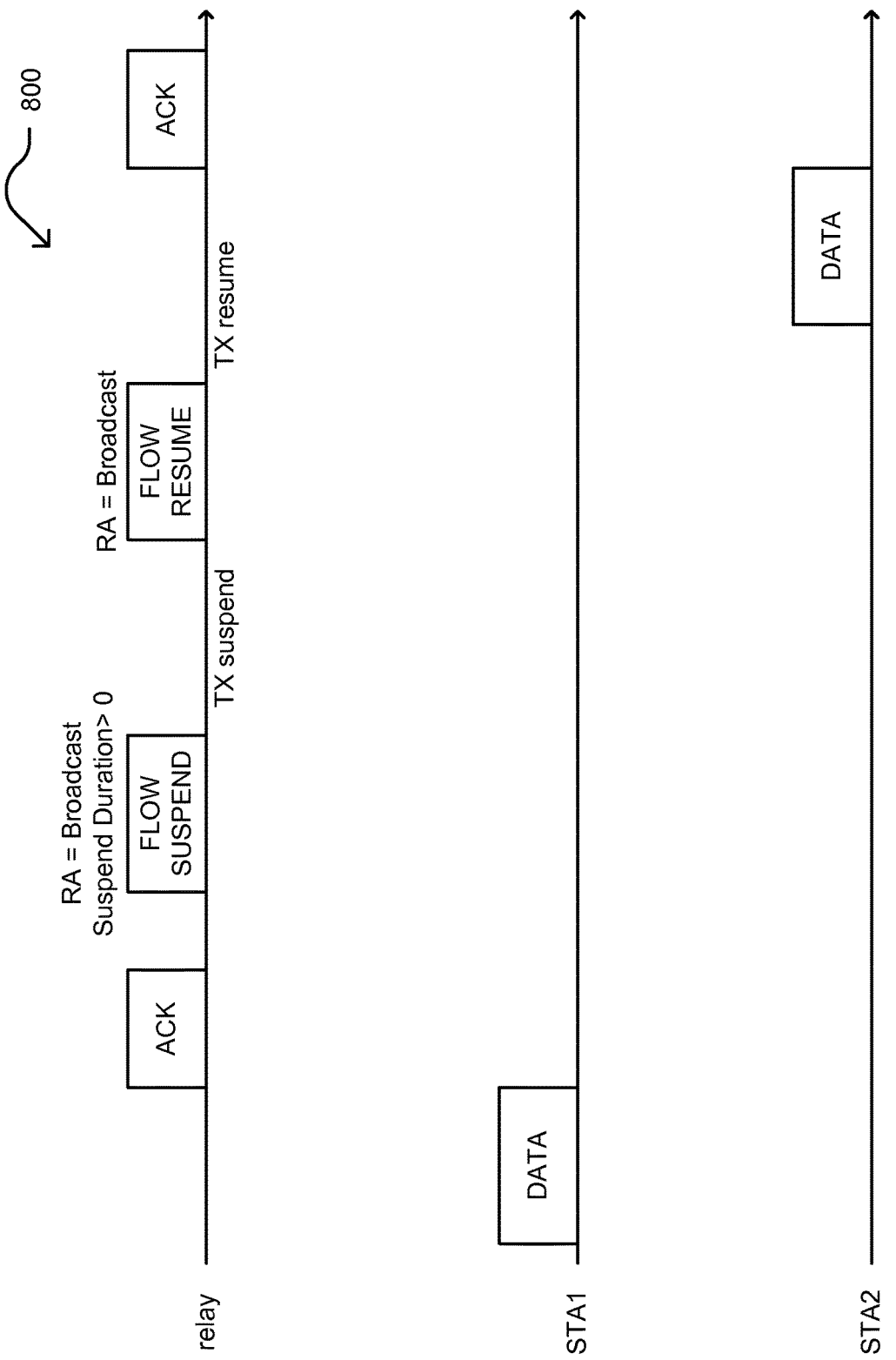
FIG. 8 is a diagram illustrating an example embodiment of flow control operation as used for memory and buffer management among various wireless communication devices.

FIG. 8 is a diagram illustrating an alternative example 800 of flow control operation as used for memory and buffer management among various wireless communication devices. Operation of this diagram employs the use of a suspend transmission request (shown as FLOW SUSPEND in the diagram) and a resume transmission request (shown as FLOW RESUME in the diagram).

Initially, a first or source wireless communication device (STA1 in the diagram) transmits data intended for a second or destination wireless communication device (STA2 in the diagram). The relay provides an acknowledgement (ACK) to STA1 upon receipt of that data.

In the instance that the relay is unable to forward that data to the STA2 in the current transmission opportunity (TXOP), the relay may transmit suspend transmission request (FLOW SUSPEND) notifying other wireless communication devices within the system including the STAT. Additional storing of signals received from the STA1 may cause the available storage capacity within buffer or memory of the relay to reduce. As such, the relay transmitting the suspend transmission request (FLOW SUSPEND) will signal the STA1 to stop transmitting signals to the relay, or signal FLOW_STOP.

Any other devices within the system, such as STA2, that receive such a FLOW_STOP notification shall not transmit to the relay (e.g., the wireless communication device addressed in the RA for a particular period of time such as which may be specified within a DUR field). Generally speaking, after the relay transmits the suspend transmission request (FLOW SUSPEND), all data transmissions to the relay will suspended for a period of time (e.g., a suspend duration time). All wireless communication devices that receive the suspend transmission request (FLOW SUSPEND) shall not transmit to the relay (e.g., the wireless communication device addressed in the transmitter address (TA) for a particular period of time such as which may be specified within a suspend duration time).

After transmission of the suspend transmission request (FLOW SUSPEND), transmissions to the relay stop. Then, after some period of time, the relay transmits a resume transmission request (FLOW RESUME) to indicate that transmissions to the relay may resume, or signal FLOW_RESTART. This indication will then resume normal operation for frame transmissions to the relay (e.g., the wireless communication device addressed RA). After the resume transmission request (FLOW RESUME), all wireless communication devices may resume or continue transmission to the relay (e.g., the wireless communication device addressed in the TA).

Flow Control Procedure (FIG. 8)

To suspend frame transmissions to a relay operative wireless communication device (e.g., relay AP), that a relay operative wireless communication device (e.g., relay AP), may send a unicast or a broadcast Relay Flow Suspend action frame, and Suspend Duration>0. The respective associated wireless communication devices (e.g., STAs) shall not transmit data frames to the wireless communication device (e.g., STA) addressed in the Transmitter Address (TA) for the amount of time indicated in Suspend Duration field. Also, the respective associated wireless communication devices (e.g., STAs) may resume normal procedure for data frame transmissions when the Suspend Duration time has expired.

To restart frame transmissions to the relay operative wireless communication device (e.g., relay AP), that relay operative wireless communication device (e.g., relay AP) may send a unicast or a broadcast Relay Flow Resume action frame. The respective associated wireless communication devices (e.g., STAs) shall cancel the flow suspend time, and resume normal procedure for data frame transmissions to the wireless communication device (e.g., STA) addressed in the TA. The sending of the Relay Flow Resume action frame by the relay wireless communication device is option, and may be used by the relay wireless communication device to cancel an existing Suspend Duration.

As also described with respect to other embodiments herein, a given wireless communication device (e.g., one operating as a relay) may service multiple wireless communication devices (e.g., STAs) at a single time, and have limited memory buffer to frames that are not yet forwarded.

Various fields may be employed to effectuate the signaling for use by a relay operative wireless communication device (e.g., relay AP, a relay STA, etc.). Some embodiments operate to use two Relay Action frames as signaling frames for flow suspend and resume (e.g., based on a suspend transmission request and a resume transmission request, respectively).

Various tables are presented below showing new relay action frames.

TABLE 1

Relay Action field values

| Field Value | Meaning |
| --- | --- |
| 0 | Reachable Address Update |
| 1 | Relay Flow Suspend |
| 2 | Relay Flow Resume |
| 3-255 | Reserved |

TABLE 2

Relay Flow Suspend frame format

| Order | Information |
|---|---|
| 1 | Category |
| 2 | Relay Action |
| 3 | Suspend Duration (micro-seconds) |

TABLE 3

Relay Flow Resume frame format

| Order | Information |
|---|---|
| 1 | Category |
| 2 | Relay Action |

Also, a bit may be added to a S1G control response frames for use in a signaling frame to suspend transmissions to the relay wireless communication device. For example, certain S1G control response frames (e.g., target wake time (TWT) acknowledgement (TACK) frames, Short TWT acknowledgement (STACK) frames, block acknowledgement TWT (BAT), etc.) may include a signaling bit so that such S1G control response frames may be used as signaling frames to suspend transmissions to the relay wireless communication device. As such, the relay wireless communication device can then effectively suspend a source wireless communication device from sending any more data frames to the relay wireless communication device with such signaling included within a response frame to that source wireless communication device (e.g., in a most recent ACK, or any other type of response frame). Either a Relay Flow Resume frame or a modified response frames (e.g., TACK, STACK, BAT, etc.) can operate as a suspend transmission request for the source wireless communication device to suspend transmission to the wireless communication device (e.g., for a predetermined period of time, until a resume transmission request is sent, etc.).

Figure 9:
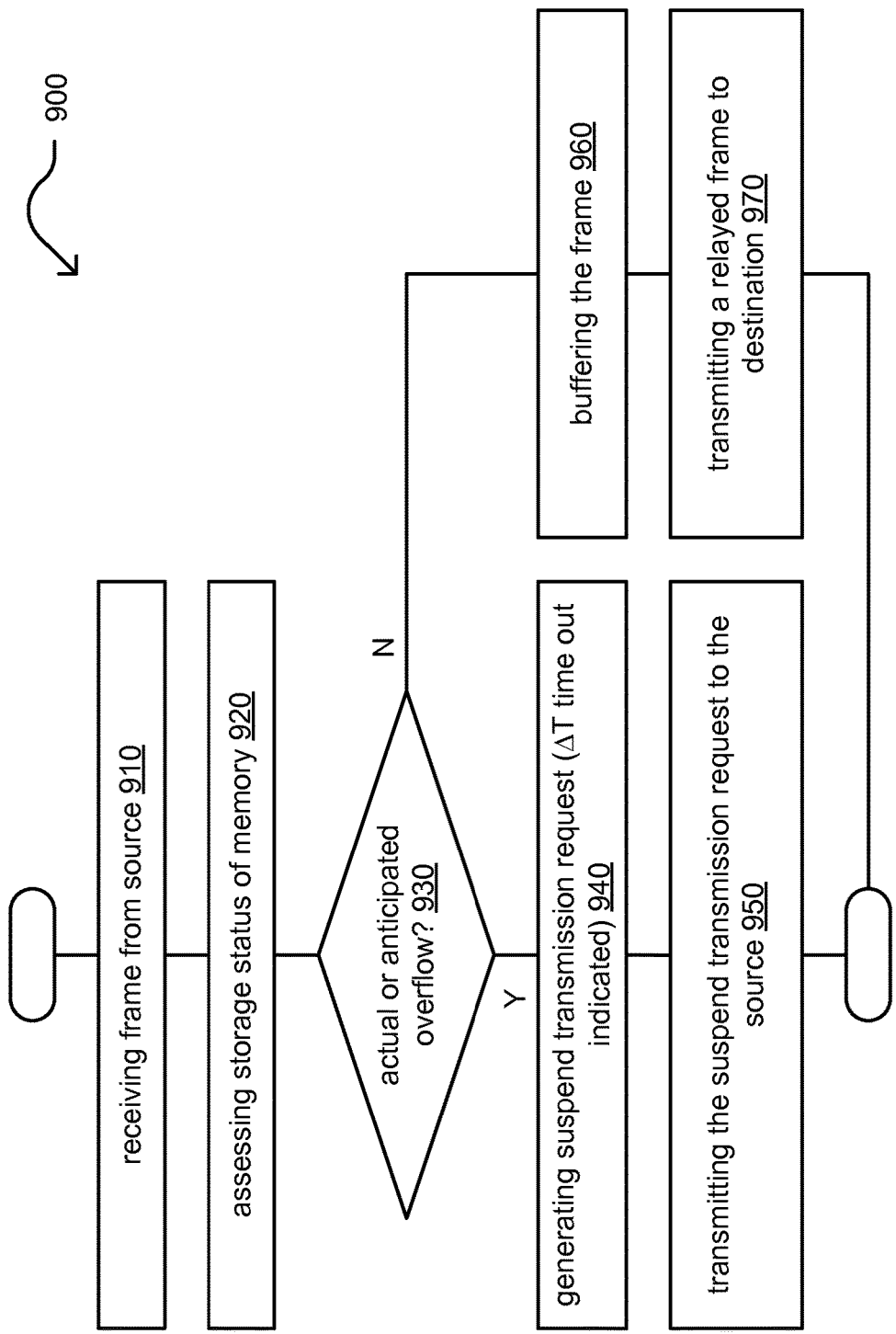
FIG. 9 is a diagram illustrating an embodiment of a method for execution by one or more wireless communication devices.

FIG. 9 is a diagram illustrating an embodiment of a method 900 for execution by one or more wireless communication devices. The method 900 begins by operating a communication interface of a relay wireless communication device to receive a frame from a source wireless communication device, as shown in a block 910. Eventually, the relay wireless communication device may operate to transmit a second signal that includes at least a portion of the first signal to a destination wireless communication device, as shown in a block 970.

The method 900 continues by assessing stored status of memory within the relay wireless communication device, as shown in the block 920. For example, the relay wireless communication device may operate to perform buffering of all or at least a portion the frame (and/or other frames) within a memory of the relay wireless communication device.

Storage status of the memory within the relay wireless communication device may indicate an actual or anticipated overflow, such as when the memory does not have adequate available storage capacity to store additional information which may be provided from the source.

If an actual or anticipated overflow of the memory is determined, as within the block 930, then the method 900 operates by generating a suspend transmission request for the source, as shown in a block 940. The suspend transmission request may indicate a period of time (e.g., $\Delta T$ or a timeout period) during which the source is to abstain from transmitting any signals to the relay. The method 900 operates by transmitting the suspend transmission request to the source, as shown in a block 950.

Alternatively, if no actual or anticipated overflow of the memory is determined, as within the block 930, then the method 900 operates by buffering the frame (and/or other frames received from the source), as shown in a block 960. The method 900 continues by transmitting a relayed frame that includes at least a portion of the frame received from the source (e.g., the data, payload, etc. thereof), to the destination, as shown the block 970.

Figure 10:
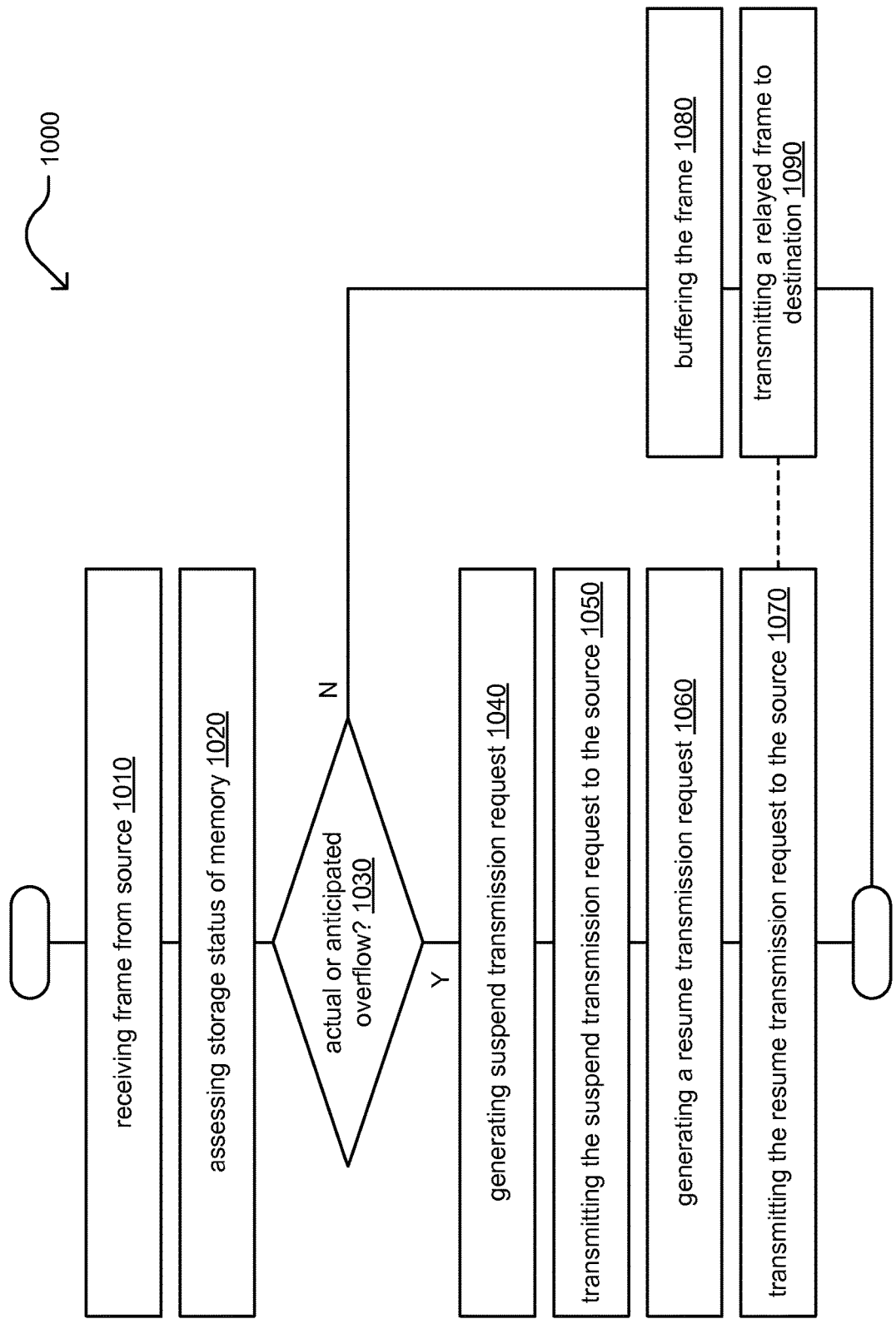
FIG. 10 is a diagram illustrating an alternative embodiment of a method for execution by one or more wireless communication devices.

FIG. 10 is a diagram illustrating an alternative embodiment of a method 1000 for execution by one or more wireless communication devices. This operation is somewhat similar to the previous diagram, with at least one difference being that a resume transmission request is employed to direct the source wireless communication device to resume transmissions to the relay wireless communication device, instead of the source wireless communication device abstaining from transmitting to the relay wireless communication device for some period of time (e.g., $\Delta T$ or a timeout period). Appropriate exchange of a suspend transmission request and a resume transmission request governs the transmission of information from the source to the relay.

The method 1000 begins by operating a communication interface of a relay wireless communication device to receive a frame from a source wireless communication device, as shown in a block 1010. Eventually, the relay wireless communication device may operate to transmit a relayed frame that includes at least a portion of the frame (e.g., the data, payload, etc. thereof) to a destination wireless communication device, as shown in a block 1090.

The method 1000 continues by assessing stored status of memory within the relay wireless communication device, as shown in the block 1020. For example, the relay wireless communication device may operate to perform buffering of the frame or at least a portion thereof within a memory. Storage status of the memory within the relay wireless communication device may indicate an actual or anticipated overflow, such as when the memory does not have adequate available storage capacity to store additional information.

If an actual or anticipated overflow of the memory is determined, as within the block 1030, then the method 1000 operates by generating a suspend transmission request for the source wireless communication device, as shown in a block 1040. The method 1000 operates by transmitting the suspend transmission request to the source wireless communication device, as shown in a block 1050. After some period of time, or when appropriate conditions are present (e.g., such as when there is adequate storage capacity within the memory of the relay wireless communication device to accept and store subsequent received signals, frames, etc. and/or portions thereof), the method 1000 operates by generating a resume transmission request, as shown in a block 1060.

The method 1000 operates by transmitting the resume transmission request to the source wireless communication device, as shown in a block 1070.

Alternatively, if no actual or anticipated overflow of the memory is determined, as within the block 1030, then the method 1000 operates by buffering the frame, as shown in a block 1080. The method 1000 continues by transmitting the relayed frame that includes at least a portion of the frame received from the source wireless communication device (e.g., the data, payload, etc. thereof) to the destination wireless communication device, as shown the block 1090.

It is noted that the various operations and functions described within various methods herein may be performed within a wireless communication device (e.g., such as by the baseband processing module 64, the processing module 50 as described with reference to FIG. 2) and/or other components therein. Generally, a communication interface and processor in a wireless communication device can perform such operations.

Examples of some components may include one of more baseband processing modules, one or more media access control (MAC) layers, one or more physical layers (PHYs), and/or other components, etc. For example, such a baseband processing module (sometimes in conjunction with a radio, analog front end (AFE), etc.) can generate such signals, frames, etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennae. In some embodiments, such processing is performed cooperatively by a processor in a first device and another processor within a second device. In other embodiments, such processing is performed wholly by a processor within one device.

The present invention has been described herein with reference to at least one embodiment. Such embodiment(s) of the present invention have been described with the aid of structural components illustrating physical and/or logical components and with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims that follow. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may also be used herein, the terms "processing module," "processing circuit," "processing circuitry," "processing unit" and/or "processor" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a functional block, hardware, and/or software stored on memory for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
a communication interface; and
processing circuitry that is coupled to the communication interface and configured to:
generate and transmit, via the communication interface, a suspend transmission frame to another wireless communication device to direct the another wireless communication device to suspend transmission to the wireless communication device for a predetermined period of time specified within the suspend transmission frame; and
generate and transmit, via the communication interface, a resume transmission frame to the another wireless communication device to direct the another wireless communication device to resume transmission to the wireless communication device before expiration of the predetermined period of time specified within the suspend transmission frame.

2. The wireless communication device of claim 1, wherein the processing circuitry is further configured to:
receive, via the communication interface, first one or more frames from the another wireless communication device before transmission of the suspend transmission frame to the another wireless communication device; and
receive, via the communication interface, second one or more frames from another wireless communication device after transmission of the resume transmission frame to the another wireless communication device.

3. The wireless communication device of claim 1 further comprising:
a memory configured to buffer one or more frames received from the another wireless communication device; and
the processing circuitry configured to:
monitor storage status of the memory; and
generate the suspend transmission frame when the storage status of the memory indicates an actual or anticipated storage overflow of the memory.

4. The wireless communication device of claim 1 further comprising:
a memory configured to buffer one or more frames received from the another wireless communication device; and
the processing circuitry configured to:
monitor storage status of the memory; and
generate the resume transmission frame when the storage status of the memory indicates an acceptable amount of memory is available to buffer an additional one or more frames received from the another wireless communication device.

5. The wireless communication device of claim 1, wherein the processing circuitry is further configured to:
receive, via the communication interface, one or more frames from the another wireless communication device;
generate and transmit, via the communication interface, the suspend transmission frame to the another wireless communication device to direct the another wireless communication device to suspend transmission to the wireless communication device;
generate and transmit, via the communication interface, the resume transmission frame to the another wireless communication device to direct the another wireless communication device to resume transmission to the wireless communication device; and
transmit, via the communication interface, the one or more frames to at least one other wireless communication device, wherein the wireless communication device includes a relay wireless communication device, the another wireless communication device includes a source wireless communication device, and the at least one other wireless communication device includes a destination wireless communication device.

6. The wireless communication device of claim 1 further comprising:
a wireless station (STA), wherein the another wireless communication device includes an access point (AP), another STA, or a smart meter station (SMSTA).

7. The wireless communication device of claim 1 further comprising:
an access point (AP), wherein the another wireless communication device includes another AP, a wireless station (STA), or a smart meter station (SMSTA).

8. A wireless communication device comprising:
a communication interface; and
processing circuitry that is coupled to the communication interface and configured to:
generate and transmit, via the communication interface, a suspend transmission frame to another wireless communication device to direct the another wireless communication device to suspend transmission to the wireless communication device for a predetermined period of time specified within the suspend transmission frame; and
generate and transmit, via the communication interface, a resume transmission frame to the another wireless communication device to direct the another wireless communication device to resume transmission to the wireless communication device.

9. The wireless communication device of claim 8 further comprising:
a memory configured to buffer one or more frames received from the another wireless communication device; and
the processing circuitry configured to:
monitor storage status of the memory;
generate the suspend transmission frame when the storage status of the memory indicates an actual or anticipated storage overflow of the memory; and
generate the resume transmission frame when the storage status of the memory indicates an acceptable amount of memory is available to buffer an additional one or more frames received from the another wireless communication device.

10. The wireless communication device of claim 8, wherein the processing circuitry is further configured to:
receive, via the communication interface, first one or more frames from the another wireless communication device before transmission of the suspend transmission frame to the another wireless communication device;
generate and transmit, via the communication interface, the resume transmission frame to the another wireless communication device to direct the another wireless communication device to resume transmission to the wireless communication device before expiration of the predetermined period of time specified within the suspend transmission frame; and
receive, via the communication interface, second one or more frames from another wireless communication device after transmission of the resume transmission frame to the another wireless communication device.

11. The wireless communication device of claim 8, wherein the processing circuitry is further configured to:
receive, via the communication interface, one or more frames from the another wireless communication device;
generate and transmit, via the communication interface, the suspend transmission frame to the another wireless communication device to direct the another wireless communication device to suspend transmission to the wireless communication device;
generate and transmit, via the communication interface, the resume transmission frame to the another wireless communication device to direct the another wireless communication device to resume transmission to the wireless communication device; and
transmit the one or more frames to at least one other wireless communication device, wherein the wireless communication device includes a relay wireless communication device, the another wireless communication device includes a source wireless communication device, and the at least one other wireless communication device includes a destination wireless communication device.

12. The wireless communication device of claim 8 further comprising:
a wireless station (STA), wherein the another wireless communication device includes an access point (AP), another STA, or a smart meter station (SMSTA).

13. The wireless communication device of claim 8 further comprising:
an access point (AP), wherein the another wireless communication device includes another AP, a wireless station (STA), or a smart meter station (SMSTA).

14. A method for execution by a wireless communication device, the method comprising:
generating and transmitting, via a communication interface of the wireless communication device, a suspend transmission frame to another wireless communication device to direct the another wireless communication device to suspend transmission to the wireless communication device for a predetermined period of time specified within the suspend transmission frame; and
generating and transmitting, via the communication interface of the wireless communication device, a resume transmission frame to the another wireless communication device to direct the another wireless communication device to resume transmission to the wireless communication device.

15. The method of claim 14 further comprising:
receiving first one or more frames from the another wireless communication device before transmission of the suspend transmission frame to the another wireless communication device; and
receiving second one or more frames from another wireless communication device after transmission of the resume transmission frame to the another wireless communication device.

16. The method of claim 14 further comprising:
buffering one or more frames received from the another wireless communication device within a memory of the wireless communication device;
monitoring storage status of the memory; and
generating the suspend transmission frame when the storage status of the memory indicates an actual or anticipated storage overflow of the memory.

17. The method of claim 14 further comprising:
buffering one or more frames received from the another wireless communication device within a memory of the wireless communication device;
monitoring storage status of the memory; and
generating the resume transmission frame when the storage status of the memory indicates an acceptable amount of memory is available to buffer an additional one or more frames received from the another wireless communication device.

18. The method of claim 14 further comprising:
receiving one or more frames from the another wireless communication device;
generating and transmitting the suspend transmission frame to the another wireless communication device to direct the another wireless communication device to suspend transmission to the wireless communication device;
generating and transmitting the resume transmission frame to the another wireless communication device to direct the another wireless communication device to resume transmission to the wireless communication device; and
transmitting the one or more frames to at least one other wireless communication device, wherein the wireless communication device includes a relay wireless communication device, the another wireless communication device includes a source wireless communication device, and the at least one other wireless communication device includes a destination wireless communication device.

19. The method of claim 14, wherein the wireless communication device includes a wireless station (STA), and the another wireless communication device includes an access point (AP), another STA, or a smart meter station (SMSTA).

20. The method of claim 14, wherein the wireless communication device includes an access point (AP), and the another wireless communication device includes another AP, a wireless station (STA), or a smart meter station (SMSTA).

* * * * *